US006900722B1

(12) United States Patent
Gotauco

(10) Patent No.: US 6,900,722 B1
(45) Date of Patent: May 31, 2005

(54) APPARATUS AND METHOD TO ENHANCE MOTOR VEHICLE SAFETY

(76) Inventor: Thomas Gotauco, 335 Plain Meetinghouse Rd., West Greenwich, RI (US) 02817

( * ) Notice: Subject to any disclaimer, the term of this patent is extended or adjusted under 35 U.S.C. 154(b) by 738 days.

(21) Appl. No.: 09/610,256

(22) Filed: Jul. 5, 2000

Related U.S. Application Data

(63) Continuation of application No. 09/259,430, filed on Mar. 1, 1999, now Pat. No. 6,188,312.

(51) Int. Cl.$^7$ ............................................. G08B 27/00
(52) U.S. Cl. ........................ 340/326; 340/576; 340/575
(58) Field of Search ................................ 340/326, 576, 340/575, 471, 692; 307/10.8; 188/77

(56) References Cited

U.S. PATENT DOCUMENTS

| | | | |
|---|---|---|---|
| 3,922,665 A | 11/1975 | Curry et al. ................. | 340/279 |
| 3,953,831 A | 4/1976 | Estrada ........................ | 340/53 |
| 3,999,177 A | 12/1976 | Greene ........................ | 340/279 |
| 4,005,398 A | 1/1977 | Inoue et al. ................. | 340/279 |
| 4,196,412 A | 4/1980 | Sluis et al. .................. | 340/32 |
| 4,203,098 A | 5/1980 | Muncheryan ............... | 340/575 |
| 4,348,663 A * | 9/1982 | Yanagishima et al. ...... | 340/576 |
| 4,485,375 A | 11/1984 | Hershberger ............... | 340/576 |
| 4,616,208 A | 10/1986 | Nakamura ............... | 340/309.1 |
| 4,879,542 A | 11/1989 | Elsey ......................... | 340/326 |
| 5,012,226 A | 4/1991 | Love ........................... | 340/576 |
| 5,389,913 A | 2/1995 | Boser et al. ................ | 340/471 |
| 5,392,030 A | 2/1995 | Adams ........................ | 340/576 |
| 5,402,108 A | 3/1995 | Tabin et al. ................ | 340/575 |
| 5,473,306 A | 12/1995 | Adell .......................... | 340/468 |
| 5,559,495 A | 9/1996 | Cochran ..................... | 340/457 |
| 5,602,427 A | 2/1997 | Dimitriev ................... | 307/10.8 |
| 5,637,927 A | 6/1997 | Stronczek et al. ......... | 307/10.1 |
| 5,684,455 A * | 11/1997 | Williams et al. ............ | 340/439 |
| 5,684,461 A | 11/1997 | Jones ........................ | 340/575 |
| 5,684,462 A | 11/1997 | Gold .......................... | 340/576 |
| 5,714,925 A | 2/1998 | Lee et al. ............... | 340/309.15 |
| 5,777,556 A | 7/1998 | Hilliard ....................... | 340/576 |
| 5,847,648 A * | 12/1998 | Savor et al. .............. | 340/309.7 |
| 5,874,892 A | 2/1999 | Antonellis ................... | 340/438 |
| 5,921,355 A | 7/1999 | Mostrom ................. | 188/77 W |
| 5,923,256 A | 7/1999 | Satake et al. ............... | 340/575 |
| 5,952,928 A | 9/1999 | Washington et al. ........ | 340/575 |

FOREIGN PATENT DOCUMENTS

| | | | |
|---|---|---|---|
| GB | 2310 935 A | 9/1997 | .......... G08B/21/00 |
| TW | 257360 | 9/1995 | |

OTHER PUBLICATIONS

Tien–Tsai Li, Editor Section 13–1 Electric Circuit, Modern Automotive Electronics and Computer System, p. 334, (1995) Chuan–Hwa Technology Books Co., Ltd., Taipei City Republic of China.

Yun–Jei Hsu, Computer, Motor Control, pp. 90–91 (1991) Chuan–Hwa Technology Books CO., Ltd, Taipei City, Republic of China.

Uneo, et al., Development of Drowsiness Detection System, pp. 15–20 (1994 Vehicle Navigation & Information Systems Conference Proceedings).

International Search Report, dated Jun. 3, 2000, International Application No. PCT/US00/01793.

* cited by examiner

*Primary Examiner*—Phung Nguyen
(74) *Attorney, Agent, or Firm*—Herbert A. Newborn

(57) ABSTRACT

The present invention provides motor vehicle safety enhancement devices which, once activated, are not prematurely deactivated. In an embodiment, an electrically controllable safety device for use by an occupant of a motor vehicle includes a safety enhancer and a controller. The controller and the safety enhancer are electrically coupled to the vehicle's electrical ignition system, so that the controller may only activate the safety enhancer while the motor is on and, once activated, the safety enhancer may only be deactivated by turning the motor off. A stimulator to rouse a sleepy driver of a vehicle is provided including a signal generator capable of rousing the driver and a controller to activate the signal generator. The controller may include a momentary switch, a relay, and a diode.

15 Claims, 2 Drawing Sheets

APPARATUS AND METHOD TO ENHANCE MOTOR VEHICLE SAFETY

RELATED U.S. APPLICATION(S)

This application is a continuation of U.S. application Ser. No. 09/259,430, filed Mar. 1, 1999, now U.S. Pat. No. 6,188,312 for an invention by Gotauco. U.S. application Ser. No. 09/259,430 is hereby incorporated herein by reference.

TECHNICAL FIELD

The present invention relates to motor vehicle safety enhancement and, more specifically, to safety enhancers which may not be prematurely disabled. In particular, a stimulator to rouse a sleepy motor vehicle driver which cannot be disabled without turning the motor off is described.

BACKGROUND ART

Many motor vehicle safety enhancement devices have been developed. The effectiveness of most, if not all, such devices may easily be compromised by actions of those whom the devices are intended to protect. For example, seat belts must be fastened if they are to protect a user from sudden deceleration and impact. Seat belts should not be unbuckled until the vehicle is safe and, usually, stopped. Emergency flashers should not be prematurely deactivated.

Falling asleep while operating a motor vehicle remains a major cause of personal injury and property damage. The consequences of falling asleep are more widespread than those experienced by the motor vehicle operator. In particular, delivery and trucking companies would benefit from reduced liability insurance costs if devices were effective to reduce or eliminate the chance of their drivers causing harm to themselves, others, and their valuable cargo.

SUMMARY OF THE INVENTION

Embodiments of the present invention provide motor vehicle safety enhancement devices which, once activated, may not be prematurely deactivated. In an embodiment, an electrically controllable safety device for use by an occupant of a motor vehicle includes a safety enhancer and a controller. The controller and the safety enhancer are electrically coupled to the vehicle's electrical ignition system, so that the controller may only activate the safety enhancer while the motor is on and, once activated, the safety enhancer may only be deactivated by turning the motor off.

In another embodiment, a stimulator for use by a sleepy driver of a vehicle includes a signal generator capable of rousing the driver and a controller to activate the signal generator. The controller and the signal generator are electrically coupled to a motor vehicle ignition system, so that the controller may only activate the signal generator while the motor is on and, once activated, the signal generator may only be deactivated by turning the motor off. The signal generator may include a buzzer and a warning lamp. The controller may include a momentary switch, a relay, and a diode.

In yet another embodiment, an electrically controllable safety device for use by an occupant of a vehicle is provided. The vehicle is powered by a motor activatable by an electrical ignition system which includes an ignition switch having an ignition pole electrically coupled with a power source and an ignition throw electrically coupled with a motor starting means. The device includes a manually activatable switch having a switch pole and a switch throw with the switch pole electrically coupled to the ignition throw. The device also has a changeover relay with two input terminals, a plurality of output terminals, an inductor, and a relay switch. The first input terminal is externally electrically coupled to the ignition throw and is internally electrically coupled to a relay pole of the relay switch. The second input terminal is externally electrically coupled to the switch throw and internally electrically coupled to a first inductor end while a second inductor end is internally electrically coupled to a first output terminal which is externally coupled to ground. An electrical connection is included between the second input terminal and an active output terminal of the changeover relay and a safety enhancer is externally electrically coupled to the active output terminal. Turning the manually activatable switch on while the ignition switch is on instantaneously powers the inductor causing the relay switch to switch positions from a first position coupled to an inactive throw, which is internally electrically coupled to an inactive output terminal, to a second position coupled to an active throw internally electrically coupled to the active output terminal coupled to the safety enhancer so that, in addition to flow to the enhancer, current from the electrical ignition system flows through the inductor to keep the inductor powered.

Methods of using such electrically controllable safety devices are provided in further embodiments of the present invention.

DETAILED DESCRIPTION OF SPECIFIC EMBODIMENTS

Figure 1:
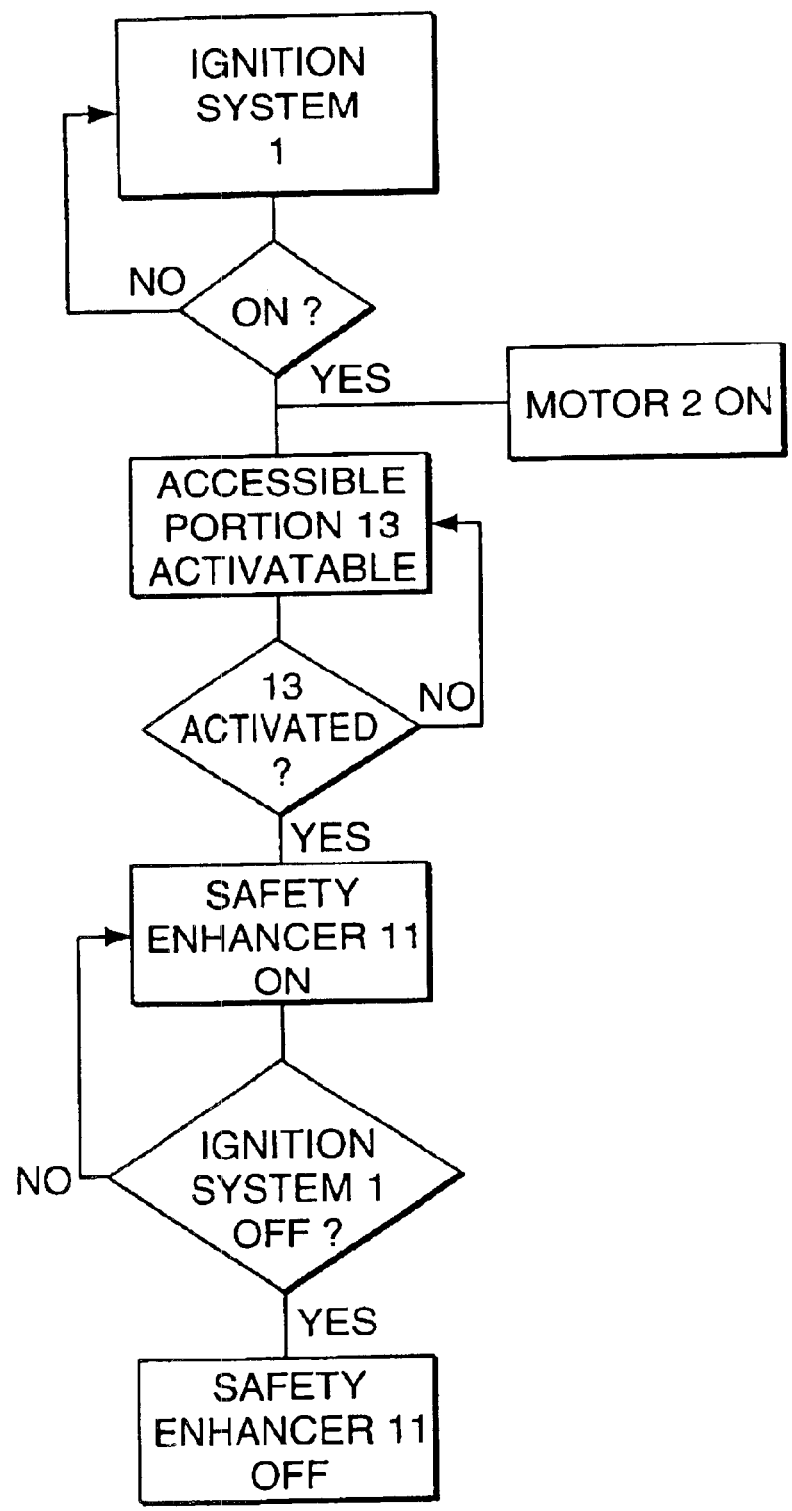
FIG. 1 is a flow diagram illustrating the operation of a motor vehicle safety enhancement device in accordance with an embodiment of the invention.

FIG. 1 shows how a motor vehicle safety enhancement device 10, in accordance with an embodiment of the invention, would be operated. Device 10 includes a safety enhancer 11 and a controller 12. Examples of safety enhancers include a stimulator described below as well as safety belts and their associated couplings and emergency flashing lights. Use of and design of other safety enhancers not specifically mentioned, when controlled in the manner disclosed below, are made without departing from the spirit and the scope of the present invention. The device 10 is activatable only after the vehicle ignition system 1 is turned on and the motor 2 is, ostensibly, running. Access to an accessible portion 13 of controller 12 is provided so that the moment at which the safety enhancer 11 may be activated is controlled by the driver or passenger. Theoretically, remote access to controller 11 could be provided using RF generation and reception or other forms of contactless activation eliminating involvement by the driver or passenger. Accessible portion 13 may include a simple toggle switch, a momentary switch, or may, within the scope of the present invention, be nonmechanical. It may be voice-actuated or otherwise turned on by stimuli known in the art of electrical switching. Controller 12 may, preferably, include other unaccessible components. The operator of an accessible portion 13 of controller 12 may turn safety enhancer 11 on; an analogous attempt to turn off the safety enhancer 11 will fail as safety enhancer 11 is electrically coupled with the vehicle ignition system 1 so that safety enhancer 11 may only be deactivated by shutting the motor 2 off by shutting off system 1. Once the accessible portion 13 is on (with system 1 on), it is, effectively, eliminated from the circuit and cannot be used to defeat safety enhancer 11. Thus, it is the combination of system 1, the accessible portion 13, and any unaccessible portion which make up the controller 12. A practical advantage of using a momentary switch for the accessible portion 13 is that such a switch will not continue to close the circuit after manual or other release by the operator. If a toggle or other type of switch were used, the operator might, inadvertently, leave the switch on after the vehicle were safely stopped. The safety enhancement device 10 would, in such a situation, disadvantageously reactivate immediately after system 1 was restarted.

Figure 2:
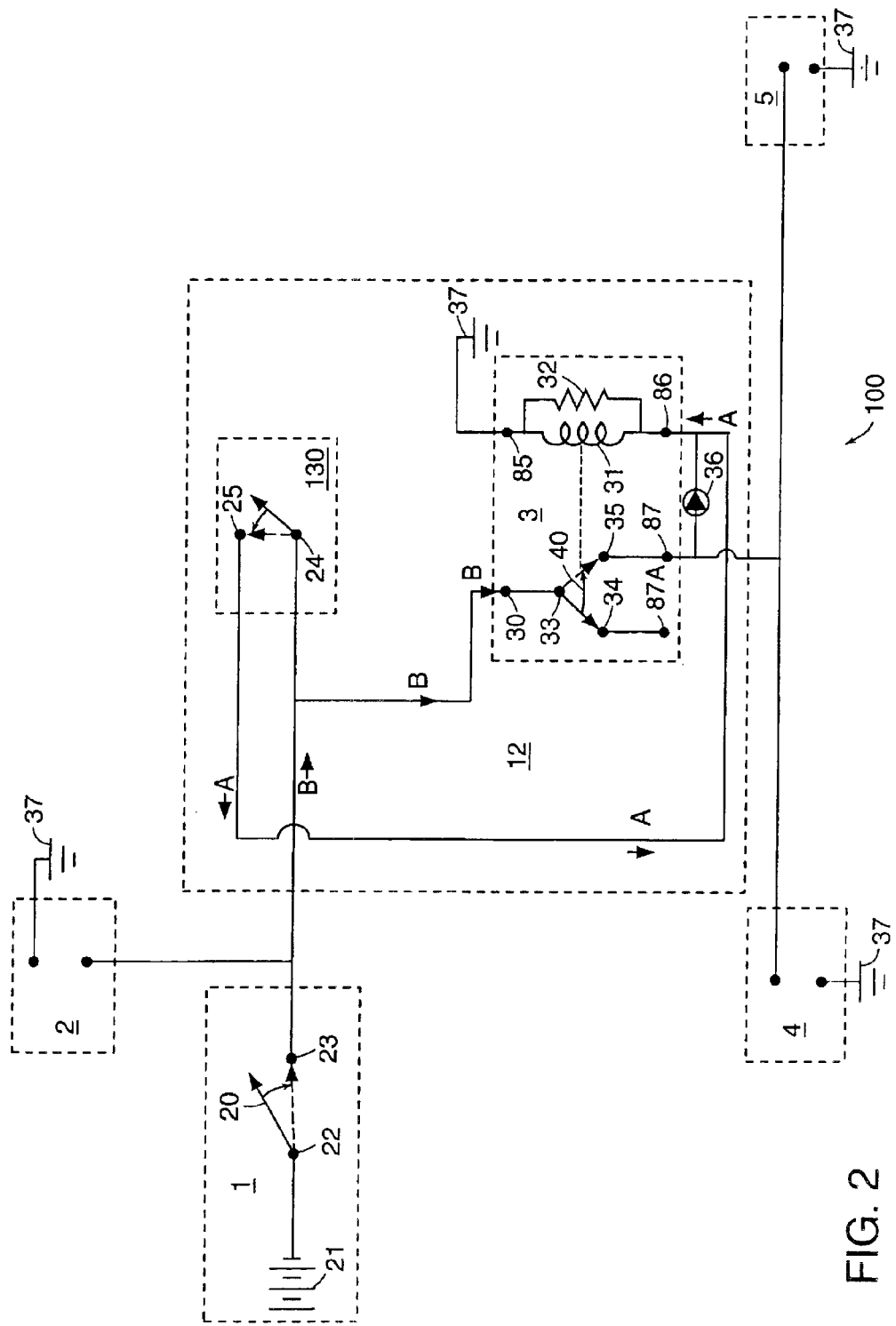
FIG. 2 is an electrical circuit diagram for a stimulator in accordance with an embodiment of the present invention.

Device 10 may, for example, stimulate a sleepy driver, enhance the safety of seat belts, or control other accessories or systems. FIG. 2 is a circuit diagram for a stimulator 100 for rousing a sleepy motor vehicle driver. The diagram includes dashed lines surrounding subelements of stimulator 100. Vehicle ignition system 1 is represented by ignition switch 20 electrically coupled at ignition pole 22 with a power source 21 for powering motor 2 and other devices. Ignition throw 23 is electrically coupled to both an input terminal 30 of changeover relay 3 (path B) and, downstream, to switch pole 24 of manually activatable switch 130. Switch 130 represents the accessible portion 13 of the controller 12, while relay 3 is an unaccessible portion of controller 12. While motor 2 is running (and ignition switch 20) are on, a driver or passenger may activate switch 130. When the connection between switch pole 24 and switch throw 25 is made, current may flow through path A into relay input terminal 86. Prior to and after activation of path A, current flows through path B to relay pole 33 of relay switch 40. Prior to activation of path A, relay switch 40, shown as single pole, double throw, couples relay pole 33 with first throw 34. First throw 34 is internally electrically coupled to inactive output terminal 87A. Activation of path A, allows current to flow from relay input terminal 86 into a winding (comprised of inductor 31 coupled in parallel with resistor 32) and out of relay 3 at output terminal 85 to ground 37. The effect is to turn inductor 31 on, thereby switching relay switch 40 so that, as long as inductor 31 is on, relay switch 40 remains in a position coupling relay pole 33 to second throw 35. This is the origin of the designation of this type of relay 3 as a changeover relay. Safety enhancer 11 (in this case, buzzer 4 and warning lamp 5) are powered while relay switch 40 remains in this position as the circuit between second throw 35 and active relay output terminal 87 remains complete. An electrical connection is included between relay input terminal 86 and active relay output terminal 87 upstream from buzzer 4 and warning lamp 5. Preferably, a diode 36, is placed in this connection path to protect these relatively high current lines impeding flow back through relay switch 40. This electrical connection through diode 36 maintains inductor 31 in the on state when switch 130 is turned off. Current no longer need pass through path A, relay switch 40 remains in position, and buzzer 4 and warning lamp 5 remain powered until ignition switch 20 is opened. When ignition switch 20 is opened, flow through path B stops, inductor 31 shuts off, and relay switch 40 shifts to its first position coupling relay pole 33 to first (inactive) throw 34, in turn, opening the circuit to buzzer 4 and warning lamp 5. For example, if accessible switch 130 is a spring-loaded momentary switch, inductor 31 remains powered after contact between pole 24 and throw 25 is lost. This illustrates a benefit of using a momentary switch 130 in that an operator may easily leave switch 130 on, causing buzzer 4 and warning lamp 5 to turn on upon restart of ignition system 1.

For example, a motor vehicle driver notices that he is becoming sleepy while driving. The driver activates a switch readily accessible to him. It may be mounted on or near the dashboard. It may be a push button, lighted momentary switch. Once activated, buzzer 4 and warning lamp 5 become active, rousing the driver. He, then, has a chance to safely pull the vehicle off the road. Buzzer 4 and warning lamp 5 remain active until the ignition system 1 is turned off. The circuit diagram of FIG. 2 may, while remaining within the scope of the present invention, be modified to include activation of other safety enhancers which may not be prematurely disabled. Other safety enhancers, such as seat belt controls and emergency flashers, may be so included in the safety enhancement device 10.

Accessible switch 130 may preferably be a lighted momentary switch found in many electronic supply venues. Relay 3 may be a 12 volt, 20/30 ampere rated model for which a Bosch No. 0-332-209-150 is well suited. Electrical relays are commonly used in conjunction with motor vehicle accessories which draw relatively large amperage. Within the framework of the vehicle's overall electrical system, if accessories draw an inordinate amount of current, resultant undesirable voltage drops can compromise other system functions. Reference numbers 30, 85, 86, 87, and 87A are the numerals actually used on this particular changeover relay. Diode 36 may be general purpose (e.g. an NTE116 silicon) rectifier having a maximum peak surge forward current rating of 30 amperes. Buzzer 4 may be a 6–16 volt DC, 100 decibel piezobuzzer (e.g. Radio Shack No. 273-070). Warning lamp 5 should be 12 volt DC.

Although the invention has been described with reference to several preferred embodiments, it will be understood by one of ordinary skill in the art that various modifications can be made without departing from the spirit and the scope of the invention, as set forth in the claims hereinbelow.

What is claimed is:

1. An electrically controllable safety device for use by an occupant of a vehicle, the vehicle powered by a motor activatable by an electrical ignition system, the safety device comprising: a safety enhancer; a controller to activate the safety enhancer; and an activatable controller switch, wherein the controller and the safety enhancer are electrically coupled to the ignition system, the controller accessible via the switch, so that the controller will only activate the safety enhancer while the motor is on and so that once activated by the controller switch, the safety enhancer will only be deactivated by turning the motor off.

2. A safety device according to claim 1, wherein the device comprises a safety belt and the safety enhancer comprises a coupling associated with the safety belt.

3. A safety device according to claim 1, wherein the device comprises an emergency flashing light.

4. A stimulator for use by a sleepy driver of a vehicle, the vehicle powered by a motor activatable by an electrical ignition system, the stimulator comprising: a signal generator capable of rousing the driver; a controller to activate the signal generator; and an activatable controller switch, wherein the controller and the signal generator are electrically coupled to the ignition system, the controller accessible via the switch, so that the controller will only activate the signal generator while the motor is on and so that once activated by the controller switch, the signal generator will only be deactivated by turning the motor off.

5. A stimulator according to claim 4, wherein the signal generator includes a buzzer.

6. A stimulator according to claim 5, wherein the signal generator includes a warning lamp.

7. A stimulator according to claim 4, wherein the signal generator includes a warning lamp.

8. A stimulator according to claim 4, wherein the activatable controller switch is a momentary switch.

9. A stimulator according to claim 8, wherein the controller includes a relay.

10. A stimulator according to claim 9, wherein the controller further includes a diode.

11. A stimulator according to claim 10, wherein the relay is a changeover relay.

12. A method of using an electrically controllable safety device in a vehicle, the safety device comprising: a safety enhancer; a controller to activate the safety enhancer; and an activatable controller switch, the vehicle powered by a motor activatable by an electrical ignition system, the controller accessible via the switch, so that the controller will only activate the safety enhancer while the motor is on, the method comprising: powering the motor with the ignition system, activating the controller with the switch such that the ignition system keeps the device on; and switching off the ignition system to shut off the motor and the device.

13. A method according to claim 12, wherein the device is a stimulator for use by a sleepy drive.

14. A method according to claim 12, wherein the device is a safety belt.

15. A method according to claim 12, wherein the device comprises an emergency flashing light.

* * * * *